March 27, 1951 F. C. MOCK ET AL 2,546,902
CONTROL FOR INTERNAL-COMBUSTION ENGINES
Filed Sept. 26, 1947 4 Sheets-Sheet 3

INVENTORS
FRANK C. MOCK
EDWIN G. KELLER
BY
ATTORNEY

INVENTORS
FRANK C. MOCK
EDWIN G. KELLER
BY [signature]
ATTORNEY

Patented Mar. 27, 1951

2,546,902

UNITED STATES PATENT OFFICE 2,546,902

CONTROL FOR INTERNAL-COMBUSTION ENGINES

Frank C. Mock, South Bend, and Edwin G. Keller, Michigan City, Ind., assignors to Bendix Aviation Corporation, South Bend, Ind., a corporation of Delaware Application September 26, 1947, Serial No. 776,296

17 Claims. (Cl. 123—103)

This invention relates to a power control system for supercharged aircraft engines whereby a given power output may be automatically maintained at varying altitudes as determined by the setting of a power control lever or quadrant; it is particularly adapted for use with a supercharging system employing one or more fluid or hydraulic couplings for varying the engine-to-supercharger speed ratio.

An object of the invention is to provide an improved boost or power control system for supercharged aircraft engines by means of which a given manifold pressure, as selected by a pilot, will be automatically maintained from ground level up to high blower critical with a minimum of hunting or instability.

Another object is to provide power control mechanism for aircraft engine supercharging systems utilizing one or more engine driven fluid couplings wherein hydraulic fluid is metered to the couplings as a function of manifold pressure datum, altitude and engine speed.

Another object is to provide a coordinated throttle control and hydraulic coupling control in a system of the type specified which will respond promptly to a pilot's demands with a minimum of hunting or surging.

Another object is to provide in a hydraulic coupling supercharger control system means whereby a moderate variation in the oil supply pressure will not appreciably affect the operation of the control.

Another object is to coordinate in a power control device, a throttle control and a hydraulic coupling control without involving complicated interconnecting and antihunt mechanism and as a result of which the device may be made relatively simple and light in weight.

A further object is to improve the operating characteristics of the oil metering valve which is usually present in power control systems of the fluid coupling type.

A still further object is to provide a new method of regulating the speed of a supercharger driven from an engine through one or more hydraulic couplings, based on the discovery that the speed of the supercharger connected to the driven side or element of a coupling is a substantially direct function of oil or other hydraulic fluid flow to the coupling at practically any speed of the engine which drives the other side or element of the coupling.

The foregoing and other objects and advantages will become apparent in view of the following description taken in conjunction with the drawings; wherein.

Figure 5:
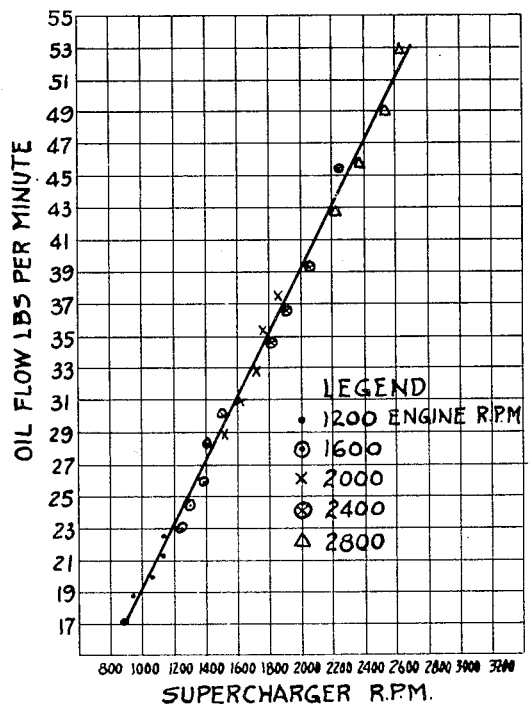
Figure 6:
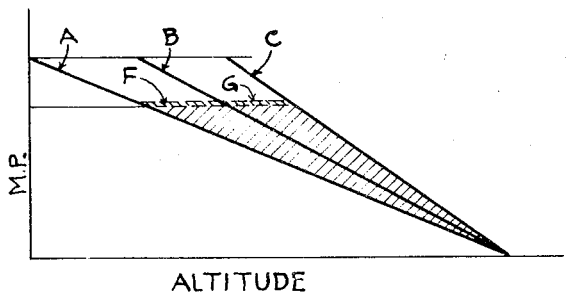

Figure 5 is a curve chart, plotting oil flow against supercharger speed, to illustrate how the R. P. M. of the supercharger is a direct function of oil flow to the fluid coupling at any engine speed; and Figure 6 is another curve chart, illustrating the operation of the control.

Figure 1:
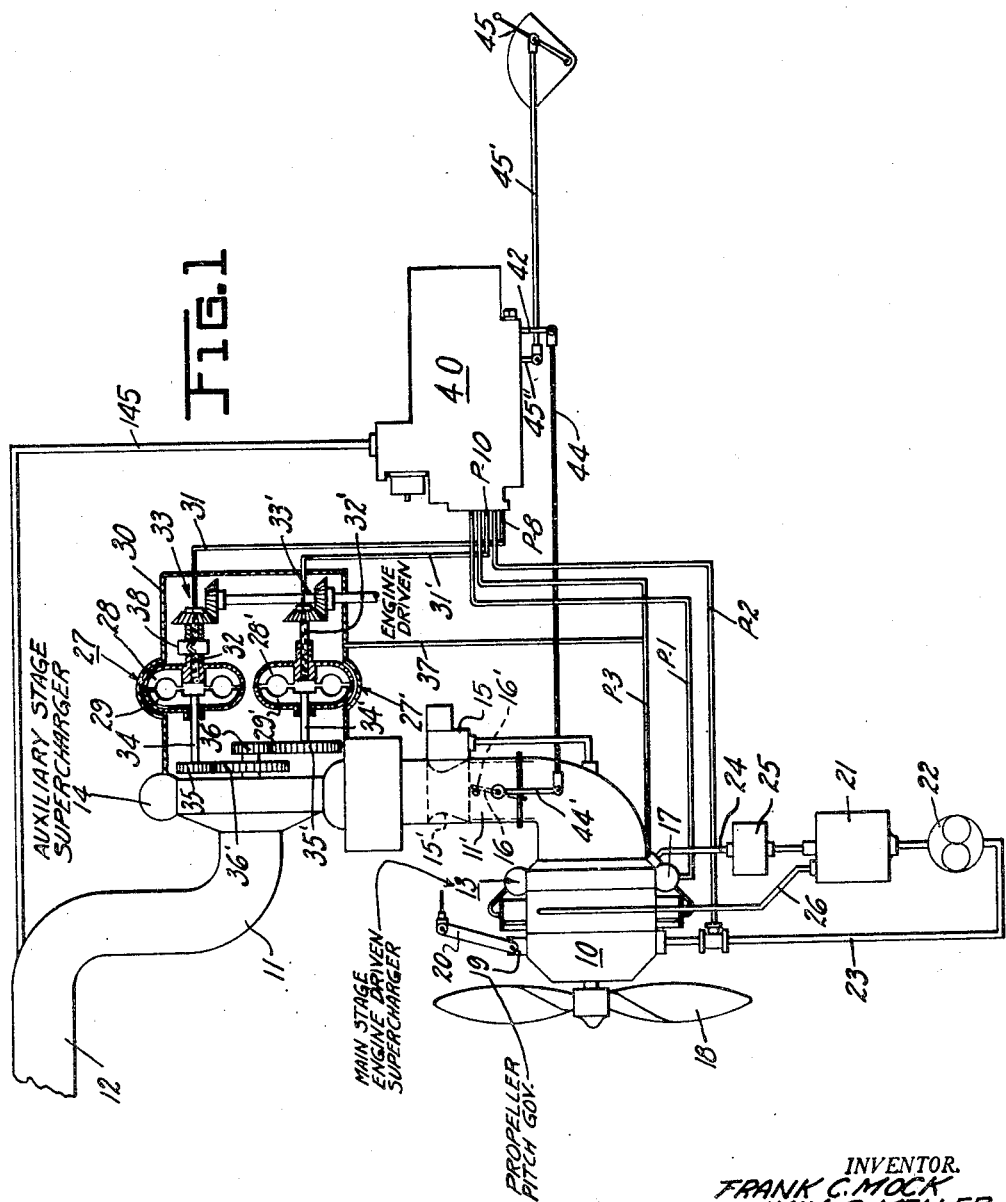
Figure 1 is a view in elevation of an aircraft engine and coacting supercharger system having the power control of the present invention operatively associated therewith.

Referring to the drawings, and first to Figure 1, an aircraft engine 10 has an air induction conduit 11, 11' which receives air from an air scoop or like device, part of which is indicated at 12. For the purposes of illustration, the air induction or input system is of the multi-stage type, including a supercharger 13, herein termed the "main stage," which is engine driven with a fixed gear ratio and supplies pressure under all conditions of operation, and a supercharger 14, herein termed the "auxiliary stage" since it is regulated to supplement the supercharger 13 under certain conditions of operation, as at wide or nearly wide open throttle, when the capacity or "critical" of the main stage supercharger is reached. A charge forming device such as a carburetor is shown at 15 including a venturi 15', and posterior the venturi is a throttle valve 16 for variably limiting the supply of air flowing to the intake manifold 17 of the engine and thence to the respective engine cylinders. A stop 16' limits the wide-open position of the throttle. The engine is equipped with a propeller 18, preferably but not necessarily of the variable pitch type, the pitch of the blades being adjustable through the medium of a governor 19 regulable by a lever 20 which in turn may be under manual or automatic control, as desired. Since propeller pitch governors have long been known and used for controlling the speed of aircraft engines and may be purchased as a complete unit in the open market, the governor is not shown in detail in the present instance. While on certain types of aircraft engines it is customary to use a variable pitch, constant speed propeller, such is not essential in the present instance, since the control of the present invention is adapted for use with either a variable, constant speed or fixed pitch propeller.

A pressure type oil supply system includes an oil tank 21 from which oil is taken by a pump 22 and delivered under pressure to the engine bearings through conduit 23, scavenged oil being returned to the tank 21 through return line 24 and cooler 25. The engine may be vented to the top of the oil tank through line 26.

The drive on the auxiliary stage supercharger 14 is transmitted from the engine or other suitable power source through variable speed hydraulic coupling units generally indicated at 27 and 27', which may be of similar construction and have similar operating characteristics. Hydraulic couplings of this type are well known in the art and may be purchased in the open market. In general, each unit consists of a driving rotor or impeller 28 and a driven rotor or vaned runner 29 mounted in a casing 30, oil under pressure being conducted to the unit through conduit 31. The rotor 28 is usually driven from a suitable power source through step-up or step-down transmission; in the present instance it is shown secured on a shaft 32 driven from the engine through gearing 33. The drive transmitted to the unit 27' is of a ratio higher than that of the unit 27 so that the two units will cover a range of speed sufficient to give the necessary auxiliary charging capacity for rated altitude without necessitating excessive slippage at higher supercharger output powers. The rotor or vaned runner 29 drives a shaft 34 carrying a gear 35. Corresponding parts of the coupling unit 27' have been given corresponding reference numerals except that a prime (') has been added. The gears 35, 35' and 36, 36' form part of a transmission system for driving the supercharger 14.

Oil under pressure fed to the rotors through conduits 31, 31' reduces the slip between the driving rotors 28, 28' and the driven rotors or runners 29, 29', the amount of slip being in relation to the rate of feed of the oil. With little or no oil feed, the rotors or runners 29, 29' simply idle or produce very little additional load on the system. Oil fed to the coupling is eventually thrown outwardly through bleeds formed in the rotors and is returned to the drain system through conduit 37. The conduit 31 to the low speed coupling is controlled by a valve 38 operating to close the said conduit when the driven shaft 34 rotates faster than the driving shaft 32. This action causes the low speed coupling to automatically empty when the high speed coupling attains a predetermined speed and overdrives the low speed coupling, to thereby avoid loss of power which would otherwise be absorbed by the rotating oil-filled low speed coupling. The valve 38 is shown schematically, since it forms no part of the present invention.

Figure 2:
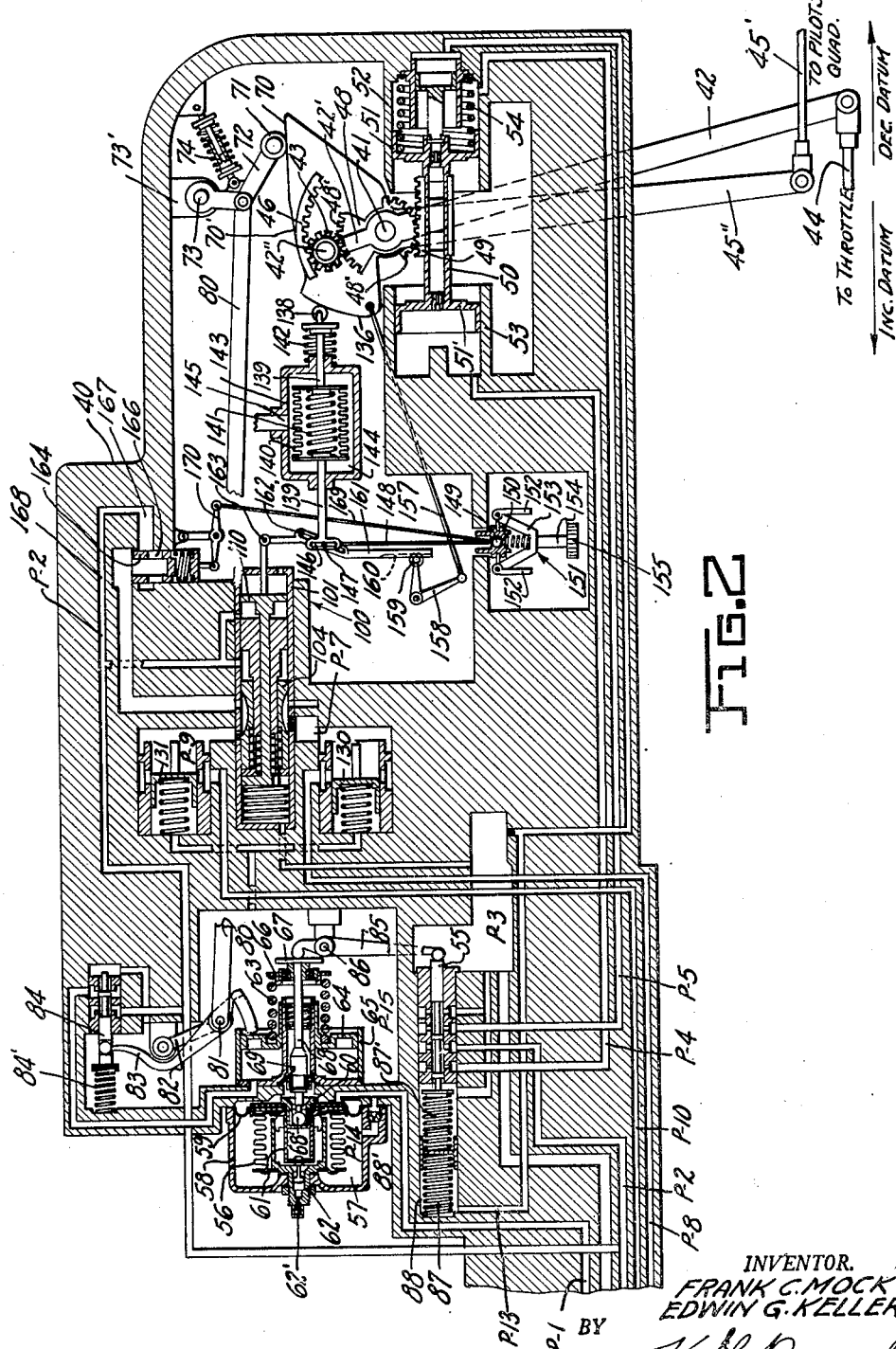
Figure 2 is a schematic sectional elevation of the power control mechanism with the engine and supercharger drive system omitted.
Figure 3:
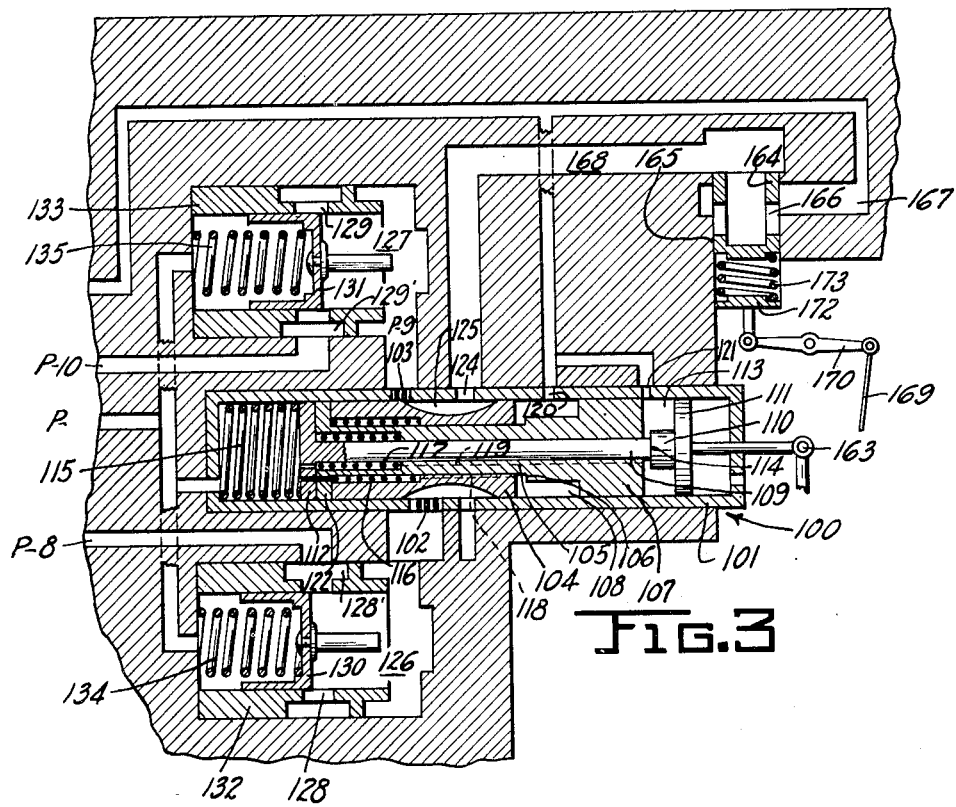
Figure 3 is an enlargement of the oil coupling valve and coacting mechanism as shown in the central portion of Figure 2, to more clearly show the various parts and provide room for reference numerals.

The various parts which go to make up the power control device are mounted in a main casing or housing 40 and are shown schematically in Figures 2 and 3 to avoid a multiplicity of sectional views. Basically, the device provides for control of manifold pressure by automatic and/or manual regulation of the carburetor throttle up to some predetermined altitude or condition of air density, usually termed the "first critical" and requiring a wide-open throttle, and beyond this point, the manifold pressure is controlled by automatic regulation of the flow of fluid to the hydraulic couplings; the carburetor throttle control and hydraulic coupling controls being correlated functionally although they are to a large extent independently operative, tending to improve stability and response characteristics.

*Control through regulation of the carburetor throttle*

This part of the control was originally disclosed and claimed in the copending application of Frank C. Mock, Serial No. 440,669, filed April 27, 1942, now Patent No. 2,453,651, and in a modified form in the copending application of James M. Eastman et al., Serial No. 686,942, filed July 29, 1946; it is claimed in the instant application only insofar as the combination thereof with the hydraulic control produces a new and/or improved result.

A main shaft 41 (see Figure 2) is journaled in the housing 40 and has secured thereon exteriorly of the housing the one extremity of a lever 42, said lever being provided with an extension 42' projecting upwardly beyond the shaft 41 and carrying a stub shaft 42'' rotatably mounting a pinion gear 43. The lower or opposite end of lever 42 is pivotally connected to the carburetor throttle by linkage 44, 44'. A main power control lever is indicated at 45 in Figure 1; it connects through link 45' with a lever 45'' (Figure 2) pivotally mounted on the shaft 41, also externally of the casing 40, and at its upper extremity beyond said shaft the lever 45'' terminates in a cam shaped portion provided with a laterally offset toothed segment or sector gear 46 in mesh with the pinion 43 carried by the extension 42' of the throttle lever 42; and said pinion in turn is in mesh with one set of teeth 48' of a segmental gear 48, loosely or pivotally mounted on the main shaft 41 and provided with another set of teeth 48'' in mesh with a toothed rack 49 secured on a piston rod 50, shown as of I-beam shape in cross section and terminating at its opposite ends in pistons 51, 51' slidable in cylinders 52 and 53. In the cylinder 52 is a spring 54 which at one end abuts the piston 51 and normally urges it and consequently the rack 49 toward the extreme left hand position (closed throttle position), and at its opposite end engages in a recess formed in the rear end wall of the cylinder 52.

The rack 49 is actuated by fluid under pressure admitted to the cylinders 52 and 53 by a servo valve 55, whose position is determined by a variable datum manifold pressure assembly including an evacuated bellows or aneroid 56 mounted in a sealed chamber 57 defined in part by a cup-shaped wall 58 and in part by a diaphragm 59 whose central portion is clamped between a pair of reinforcing plates connected to a cup-shaped guide member 60 having an encircling bushing at one end mounted for limited sliding movement in a cylinder 61 and at its opposite end provided with a ball head slidingly mounted in a guide bore or passage 62 which is provided with a vent 62' to facilitate evacuation of the bellows, after which the vent may be closed by a screw or other suitable means and the vent sealed. The bellows may be evacuated to a low absolute value and rendered responsive to changes in pressure only, or it may be evacuated and loaded with a temperature responsive inert gas and a damping fluid to render the bellows responsive to changes in both temperature and pressure; see U. S. patent to Mock et al. No. 2,376,711 for a suitable density responsive capsule of the latter type.

The desired manifold pressure datum is determined by variably loading a datum spring 63, which at one end abuts a datum piston 64 slidingly mounted in a cylinder 65 and at its opposite end abuts a thrust plate 66 forming part of a thrust bearing carried by an abutment or contact plate 67 secured on the one extremity of a datum rod or shaft 68, the opposite end of said rod or shaft having connected thereto a ball headed bolt 68' which engages in a socket at the adjacent end of the guide 60 and provides a universal joint connection between the datum rod 68 and the movable end of the bellows 56. A sealing diaphragm 69 seals the space around the aneroid shaft 68. A datum cam 70 is formed on the upper cam shaped extremity of the lever 45'' so as to be rotatable through adjustment of the lever 45, the cam 70 being engaged by a follower 71 mounted on a lever 72 which is pivotally suspended at 73 from a stationary depending bracket 73'. A compression spring 74 normally urges the follower lever 72 in a clockwise direction, tending to maintain the follower 71 against the cam 70. A link 80 is pivotally connected at one end to the lever 72 and at its opposite end is pivoted on a pin 81 which is carried by a swinging arm 82 and also serves as a floating pivot or fulcrum for a servo lever 83 whose upper end is operatively connected to a servo valve 84, designed to control admission of fluid under pressure to the cylinder 65 in back of the piston 64 in a manner to be described. The lower end of lever 83 is contoured to engage the datum piston 64, being held against it by the action of servo valve spring 84'; and the relative dimensions of said lever and the parts which make up the floating pivot 81 therefor are such that the travel of pivot 81 acts to move servo valve 84 in a direction to cause oil pressure change in back of piston 64 to move said piston and lever 83 and return servo valve 84 to the position shown, thereby setting the load on spring 63 in accordance with the travel of pivot 81 to determine the datum setting. Utilizing a servo motor to tension the datum spring relieves the pilot of considerable manual effort to effect this operation.

A servo lever 85 is pivoted or fulcrumed at 86 to a stationary bracket, and at its upper end said lever is engaged by contact plate 67 and at its lower end engages and actuates servo valve 55 to the left against the tension of springs 87, 87' mounted in a cylinder 88 and having a damping piston 88' interposed therebetween.

The various operating pressures in the flow ducts, servo valve ports, servo piston cylinders and the like, have been designated as follows:

P—1—engine manifold air pressure
P—2—engine oil pressure
P—3—drain oil pressure
P—4—throttle opening piston pressure
P—5—throttle closing piston pressure
P—7—metered oil to low coupling
P—8—feed oil to low coupling
P—9—metered oil to high coupling
P—10—feed oil to high coupling
P—13—feedback damping piston presure
P—14—aneroid chamber pressure
P—15—datum piston pressure

*Operation of the throttle control*

In the position of the parts as shown in the drawings, the pilot's control lever 45 (Figure 1) has been advanced to a relatively high power setting, thus calling for a manifold pressure of, for example, between 64 to 84 inches absolute. At this time, cam follower 71 (Figure 2) is in engagement with the high portion of datum cam 70, the floating pivot 81 is in its right hand position and the datum spring 63 is loaded sufficiently to hold the bellows 56 in a balanced condition at the existing manifold pressure and air density. Also, the servo valve 55 has been located to admit oil under pressure (P—4 pressure) to the left hand side of the throttle piston 51', which pressure has moved the pistons 51', 51 and rack gear 49 to the right and at the same time has permitted oil to drain (P—3 pressure) from the right hand side of piston 51; movement of the rack gear 49 to the right having rotated segmental gear 48 counterclockwise, and since sector gear 46 is held against rotation by lever 45'', this action has caused the pinion 43 to roll counterclockwise and act through lever 42 and link rod 44 to rotate the throttle 16 (Figure 1) to its wide open position.

The cam 70 may be and preferably is contoured to obtain direct manual throttle control over a predetermined low range of manifold pressures; above this range the throttle being automatically positioned once the datum is set by the power lever 45. Thus, at sea level with the throttle nearly closed and the engine idling, pistons 51, 51' would be to the extreme left position and the cam follower 71 would be on the substantially true radius or ineffective portion 70' of cam 70; and as long as the follower 71 remains on this low cam portion, movement of the power lever 45 will rotate the gear 46, but will not actuate the servo valve 84 sufficiently to move the pistons to the right against the force of spring 54. This will hold the segmental gear 48 against rotation, so that manual actuation of the gear 46 through levers 45, 45'' will roll the pinion 43 on gear teeth 48' and in turn actuate lever 42 to open and close the throttle.

Should the lever 45 be advanced from a low power position to an increasingly high power position such that the cam 70 (acting through lever or arm 72, link 80, floating pivot 81, servo valve 84 and datum piston 64) increases the load on the datum spring 63 to a point where the spring force overcomes the pressure tending to hold the bellows 56 collapsed, the datum rod 68 will move to the right and in turn move servo valve 55 to the left and high pressure fluid (P—2 pressure) will pass to chamber 53 on the left hand side of piston 51' and oil will drain from chamber 52 on the right hand side of piston 51. Throttle pistons 51, 51' will then move to the right and, acting through rack 49 and gear 48, will roll pinion 43 counterclockwise on gear 46 and open the throttle 16. The control then becomes automatic, or the boost control takes over, the pilot selecting the degree of manifold pressure or power output by positioning the cam 70, which is turn locates the floating pivot 81.

Should there be a decrease in air density, as by a gain in altitude, manifold pressure P—1 at the right hand side of diaphragm 59 and the pressure P—14 in chamber 57 will likewise decrease, and the aneroid or bellows 56 will tend to expand or extend itself, thereby moving the datum shaft 68 to the right, turning servo valve lever 85 clockwise and moving the servo valve 55 to the left; whereupon high pressure oil flows from P—2 channel to P—4 channel and drain oil is also bled from P—5 channel to P—3 channel and pistons 51', 51 move to the right, turning segmental gear 48 counterclockwise and rolling pinion 43 to the left, thereby moving throttle lever 42 to the right or in a direction to open the throttle and increase the manifold pressure until the pressure on the right of diaphragm 59 and in chamber 57 balances the datum setting of the spring 63.

Should there be an increase in air density, as by a drop in altitude, pressure P—1 at the right of diaphragm 59 and pressure P—14 in chamber 57 will likewise increase, bellows 58 will tend to collapse, thereby permitting datum spring 63 to move datum shaft 69 to the left, whereupon servo valve 55 will move to the right due to the pressure of springs 87, 87'. Pressure oil then flows from channel P—2 to channel P—5 and oil is drained from channel P—4 to channel P—3, whereupon pistons 51, 51' move to the left, rack 49 acts through segmental gear 48 to roll pinion gear 43 to the right, thereby moving throttle lever 42 to the left or in a direction to close the throttle 16 and reduce manifold pressure until P—1 on the right side of diaphragm 59 balances the datum setting of spring 63.

*Auxiliary stage supercharger hydraulic coupling control*

A coupling valve is generally indicated at 100 (compare Figures 2 and 3). In the form shown, it comprises a cylinder 101 formed with a series of low coupling metering holes or orifices 102 and high coupling metering holes or orifices 103. The action of these metering orifices is generally similar to that of a metering valve; they may consist of a series of holes formed through the wall of the cylinder 101 and arranged in spiral or screw formation and of gradually increasing flow capacity, or in a manner such that there is an increase in fluid delivery in substantially direct relation to linear movement of valve member 104.

For reasons which will subsequently be explained, it is of advantage to have a quick opening movement of the valve 104, or to produce a "snap action" when the valve 104 initially moves to a metering position. To produce this snap action, the valve member 104 is mounted for limited sliding movement on a stepped cylindrical member 105 formed with a shoulder or stop 106 and an annulus 107, an oil pressure chamber 108 being defined between said annulus and the adjacent end of the valve 104. The member 107 is in turn slidably mounted on the stem portion 109 of a plunger 110, the latter having a piston 111 at one end thereof and an annulus or disc 112 at its opposite end. A chamber 113 is defined between the piston 111 and adjacent end of the annulus 107, and a stop shoulder 114 limits movement of the member 105 toward the piston 111 when the valve is closed. A spring 115 normally urges the plunger and valve assembly toward return or closed position; and additional springs 116 and 117 normally urge the valve 104 toward the stop 106 and the member 105 toward the stop 114. Vents 118 and 119 communicate chambers 108 and 113 with drain or P—3 pressure. Ports 120 and 121 admit oil under P—2 pressure to chambers 108 and 113, respectively, when uncovered by inward travel of the valve assembly.

Figure 4:
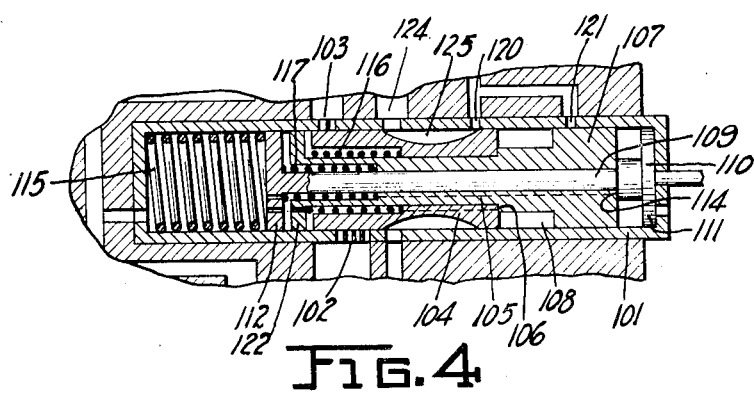
Figure 4 is a detail longitudinal sectional view of the oil coupling valve, showing an alternate position of the parts of the valve with respect to the showing in Figures 2 and 3.

The valve assembly operates as follows:

In the position of the parts in Figures 2 and 3, the valve member 104 has been moved to full metering position with respect to orifices 102 (low or intermediate blower coupling) and to an intermediate metering position with respect to orifices 103 (high blower coupling). At this time, oil under pressure has been admitted to both chambers 108 and 113 and has moved the valve member 104 to its innermost position away from stop 106, and has also moved the annulus 107 to its innermost position away from stop 114, compressing springs 116 and 117. The closed position of the valve assembly is shown in Figure 4; note that ports 120 and 121 are closed and the valve member 104 is up against the stop 106 and the annulus 107 is against stop 114. If the plunger 110 is now pushed inwardly to a point where valve member 104 uncovers port 120, oil under pressure will be admitted to chamber 108 and move the said valve member up against stop flange 122, which movement will initially start metering across orifices 102 at a predetermined effective rate rather than at a slow initially ineffective rate; and when the annulus 107 uncovers port 121, oil under pressure will be admitted to chamber 113 and the member 105 will suddenly move inwardly against disc 112, carrying the valve member 104 therewith, which action will initially start metering across the orifices 103 at a predetermined effective rate. When the plunger 110 is retracted and oil under pressure is closed off from chambers 108 and 113, residual oil in said chambers bleeds to drain through bleeds 118 and 119 and the springs 116 and 117 move the annulus 107 against stop 114 and valve member 104 against stop 106.

Hydraulic fluid, here oil under engine or P—2 pressure, flows through entrance ports 124 into valve chamber 125. From this chamber the oil is metered through metering orifices 102 and 103 to regulator valve chambers 126 and 127, and the metered oil then flows by way of valve ports 128 and 129 and chambers 128' and 129' to the P—8 and P—10 feed passages or conduits for the low and high couplings 27 and 27'.

The valves designated at 130 and 131 coact with a valve 164 and a fly weight speed indicator 151, Figure 2, to meter oil to the couplings as a function of engine speed in a manner and for a purpose to be described; they are mounted to slide in cylinders 132 and 133 against the resistance of springs 134 and 135.

Regulation of the valve 104 is coordinated with manifold pressure selection by means of a cam 136, Figure 2, shown as formed integral with the cam 70, more for the purpose of accommodating the particular schematic arrangement of parts than as a practical design, since it could be a separate cam rotated in any suitable manner as long as it is synchronized with the cam 70. The cam 136 engages a follower or roller 138 mounted on the adjacent end of a rod 139, which in turn is connected to a rod 139' through an interposed aneroid or density responsive bellows 140 loaded with a spring 141 set to maintain the bellows 140 in a predetermined condition of balance with respect to ground level density, or pressure and temperature. A return spring 142 normally urges the follower 138 against the surface of the cam 136. The bellows or aneroid 140 is mounted in a housing 143 which defines a chamber 144 adapted to have scoop or carburetor entrance pressure communicated thereto by means of a conduit 145.

The outer free end of the rod 139' is formed with a guide slot 146 in which a pin 147 has movement, said pin being connected by means of a rod 148 with a ball head 149 engaging in a bushing 150 forming part of the engine driven fly weight speed indicator assembly generally indicated at 151 and comprising a pair of weights 152 pivoted on a yoke 153 formed on the end of a shaft 154 having secured thereon a drive pinion 155 adapted to be driven from the engine by suitable driving connection or gearing, not shown.

A link rod 157 is pivotally connected at one end to the cam 136 and at its opposite end to the one arm of a bell crank 158, the other arm of said bell crank being provided with a follower 159 engaging in a track or groove 160 formed in a lever 161, the latter having an intermediate portion formed with an angulated slot 162 in which the fly weight actuated pin 147 also engages. Beyond the slot 162, the lever 161 is pivotally connected at 163 to the valve plunger 110.

The speed responsive valve 164 provides a metering pressure differential across metering orifices 102 and 103 proportional to the square of engine speed so that oil flow to the couplings will be proportional to engine speed; it is slidable in a chamber 165 and formed with ports 166, through which oil flows from an entrance channel 167 to chamber 165 and thence by way of channel 168 to port 124, and it is operatively connected to the engine driven governor 151 by means of a rod 169, lever 170, rod 171, piston 172 and spring 173. The spring rate of spring 173 relative to that of springs 134 and 135 is preferably such as to substantially equal the constant represented by each spring 134 or 135 plus drain or P—3 pressure resistance against opening movement of said latter valves.

When the engine is running, the fly weights 152 move outwardly and inwardly in relation to engine speed and position the valve 164 as a function of engine speed. This will produce a differential across the metering orifices 102 and 103 proportional to the square of engine speed, and hence the flow through the orifices will be proportional to engine speed directly.

We have discovered that the speed of a supercharger driven through a fluid coupling varies as a function of the rate of flow of oil to the coupling, as illustrated in Figure 5. This may be explained as follows: If at a given oil flow the speed of the driven side of the coupling should be increased, the peripheral speed of the latter will correspondingly increase and there will be a proportional increase in the amount of oil thrown out to drain. This increase in the rate of escape of oil to drain at a constant rate of flow to the coupling compensates for the increased speed on the driven side of the coupling, and although the fill is reduced and the slip increased, the speed of the driven side of the coupling remains substantially constant. Again, should the driven side of the coupling slow down at a given oil flow to the coupling, the peripheral speed of the driven side will correspondingly decrease, there will be less oil thrown out to drain, and the increased fill and reduced slip will compensate for the reduced driving speed.

Reverting now to the oil metering device of Figures 2, 3, and 4, since oil is metered to the couplings at a rate proportional to engine speed, the speed of the supercharger will also vary proportional to engine speed. Thus, a valve position of valve 104 giving a certain percent of coupling slip at one engine speed will give the same percent slip at any engine speed, and hence the valve position for minimum slip on the low coupling will always be the same. This permits locating the port 121 at a point such that when minimum low coupling slip is reached, further travel of the valve piston 109 will cause a snap action due to sudden pressure build-up in the chamber 113, opening the high coupling metering orifices 103 immediately so that there will be enough oil supplied to the high coupling to cause the latter to quickly overdrive the low coupling. Thus, oil in any appreciable quantity is never fed to both couplings at the same time for any continuous running condition and which would cause the couplings to buck each other, producing excessive heat rejection to the oil and wasted power.

*Operation of coordinated throttle and fluid coupling supercharger control*

When the pilot moves the power control lever 45 to obtain a desired power output, he at the same time adjusts the cams 70 and 136, the cam 70 acting through the servo valve 84 and datum piston 64 to set the datum of the manifold pressure bellows 56, and the cam 136 acting through the rod 139 to set the datum of the aneroid 140, and through the aneroid 140, rod 139′ and lever 161, to position the hydraulic metering valve 104 at a given engine speed and altitude to obtain the necessary rise across the auxiliary stage supercharger 14. Let it be assumed that the setting of the power lever 45 calls for 80″ of manifold pressure at ground level after take-off, and that the capacity of the main stage or direct engine driven supercharger is sufficient to provide the necessary charging pressure at altitudes up to line A, Figure 6, which is assumed to be "first critical"; then up to this altitude the throttle control mechanism of Figure 2 would automatically adjust the throttle to maintain the necessary charging pressure. At altitudes above line A, a boost in pressure is required from the auxiliary stage supercharger, which boost is supplied up to line B, "second critical," by regulating the supply of oil to the intermediate ratio hydraulic coupling 27. Preferably, the rise across the supercharger is sufficient to slightly exceed the required manifold pressure so that correction may be obtained by taking a throttle loss, or by a slight closing of the carburetor throttle automatically brought about by the throttle control mechanism or primary manifold pressure regulator, since this provides a reserve for sudden acceleration (note shaded area F in Figure 6). In other words, the apparatus may be set to cause the fluid coupling supercharger control to drive the auxiliary stage supercharger at a speed which will produce the required manifold pressure with a slight excess and then have the faster acting and more precise throttle control correct at a slight throttle loss. Above the line B and up to line C, "third critical," the rise across the auxiliary stage supercharger is produced by metering oil to the high ratio coupling 27; again preferably with a reserve as indicated by the shaded area G.

In the position of the parts as shown in Figure 2, it could be assumed that the pilot has set the power lever for nearly full power output and has climbed to an altitude between second (line B) and third (line C) critical. Under these conditions, the throttle 16 would be approximately wide open, the valve 104 would have opened to a point where the oil flow through metering orifices 102 had reached capacity but has been cut off by valve 38 (rendering coupling 27 inoperative), and metering through orifices 103 is at approximately half capacity and the coupling 27 is operating at say fifty percent slip. As altitude increases, the atmospheric pressure or ram density in chamber 144 decreases, causing the bellows 140 to increase in length and further open the valve 104 to maintain the required charging pressure.

Since the oil metering valve 104 responds to changes in scoop or atmospheric pressure, engine R. P. M., and pilot's control lever setting, and not to changes in manifold pressure or any variable affected by supercharger speed, the fluid coupling control is devoid of any tendency to hunt. To explain briefly, once the desired amount of supercharging is selected by the cam 136, as the bellows 140 expands (assuming a gain in altitude) it maintains the charging pressure without searching for a balanced condition and the accompanying tendency to overshoot or hunt which are present in controls where the rise across the supercharger affects the metering valve position which in turn affects the supercharger rise, etc. In such cases, the control may be considered as operating through a closed cycle and the problem of hunting is sometimes an exceedingly difficult one to solve. In the present invention, this factor is not present, the control having only a compensating action due to the fact that the aneroid 146 is unaffected by the pressure it regulates, and the problem of hunting is therefore eliminated. There is, of course, a "closed cycle effect" in the primary or throttle control, but here the engine response favors this type of control; and experience has demonstrated that an antihunt mechanism is not necessary. Again, the only tie-in between the carburetor throttle control and the coupling control is at the datum setting shaft 41, so that the two controls operate substantially independently of one another while at the same time they may be more readily "scheduled" to specific types of engines, or engines having different operating characteristics.

The drive transmitting action of the fluid couplings is not only responsive to oil fill or oil flow but it is also responsive to changes in speed on the driving side of each coupling and will accordingly vary with variation in engine speed. Ordinarily, with a variable pitch propeller coordinated with the manifold pressure control, a given manifold pressure corresponds approximately to a certain engine speed, and these two factors may be scheduled or correlated through the datum cams. But irrespective of the type of propeller used in the present invention, the effect of changes in engine speed on the couplings may be compensated for through the R. P. M. compensator 151. Thus, at any altitude requiring auxiliary stage supercharging, should the engine speed or R. P. M. vary from a scheduled value with respect to manifold pressure, the weights 152 will swing outwardly or inwardly, moving rod 148 in a direction to increase or decrease the opening or closing action of the valve 104 and maintain the correct rise across the supercharger. It will be noted that as the setting of cam 136 is decreased, bell crank 158 swings counterclockwise and the angularity of the cam slot 162 increases, since valve return spring 115 will then cause the lever 161 to rotate slightly clockwise about the pin 147 even though the spring 142 acts through rods 139, 139' to move said pin in a valve closing direction. Thus, at low supercharging settings of the cam 136 and correspondingly low engine speeds, a given change in engine speed will compensate at approximately the same rate as at higher engine speeds and supercharger rise settings.

It will be obvious to those skilled in the art that instead of regulating a fluid coupling or a hydraulic valve, the control could act on a gas turbine, blast gate, an electrical device, gear selection mechanism and the like; and although only one embodiment of the invention has been illustrated and described, various changes in the form and relative arrangements of the parts may be made to suit requirements.

We claim:

1. In a power control system for an aircraft engine provided with a supercharger and a throttle controlled air intake conduit terminating in an intake manifold, a fluid coupling for transmitting an infinitely variable drive from the engine to the supercharger, a hydraulic valve adjustable to regulate the flow of hydraulic fluid to said coupling, a power control member such as a pilot's quadrant for preselecting manifold pressure, and means operatively connecting said member to said throttle and said valve including an aneroid responsive to changes in manifold pressure arranged to automatically adjust the position of the throttle and another aneroid responsive to changes in density of the air flowing to the engine for automatically adjusting said valve, said second named aneroid being unaffected by changes in the pressure regulated by the control.

2. In a power control system for an aircraft engine provided with a supercharger and a throttle controlled air intake conduit terminating in an intake manifold, a fluid coupling for transmitting an infinitely variable drive from the engine to the supercharger, a hydraulic valve adjustable to regulate the flow of hydraulic fluid to said coupling, a power control member such as a pilot's quadrant for preselecting manifold pressure, means operatively connecting said member to the throttle and also to said valve including an aneroid responsive to changes in manifold pressure for automatically positioning the throttle to maintain a preselected manifold pressure and another aneroid responsive to changes in the density of the air flowing to the engine but unaffected by changes in the pressure to be controlled for automatically positioning said valve, and means actuated by movement of said power control member for coordinating and simultaneously setting the datum of the throttle and valve controls.

3. In a power control system for an aircraft engine provided with a supercharger and a throttle controlled air intake conduit terminating in an intake manifold, a fluid coupling for transmitting an infinitely variable drive from the engine to the supercharger and a hydraulic valve adjustable to regulate the flow of hydraulic fluid to said coupling; in combination, a manifold pressure regulator comprising a first aneroid arranged to respond to changes in manifold pressure, means operatively connecting said aneroid to the throttle for automatically positioning the latter to maintain preselected manifold pressures up to throttle capacity, variable datum means operatively connected to said aneroid, a hydraulic valve control comprising a second aneroid arranged to respond to changes in the density of the air flowing to the engine but unaffected by changes in the pressure to be regulated; means operatively connecting said second aneroid to the said hydraulic valve for automatically positioning the latter to maintain preselected manifold pressures up to supercharger capacity, variable datum means also operatively connected to said second aneroid, and a power control member such as a pilot's quadrant operatively connected to both of said variable datum means in a manner such that movement of said member simultaneously adjusts the datum of both of said aneroids and preselects the manifold pressure over substantially the entire manifold pressure range.

4. A power control system as claimed in claim 3 wherein said hydraulic valve is resiliently mounted and movement of said power control member positions said valve for a given altitude or air density and simultaneously sets the datum of the coacting or second named aneroid.

5. In a power control system for an aircraft engine provided with a supercharger and an intake manifold, a device adjustable to regulate the rise across the supercharger, a power control member such as a pilot's quadrant, means operatively connecting said power control member to said device including an element responsive to changes in air density and associated means adjustable by movement of said member to maintain a selected manifold pressure at varying altitudes, and means responsive to changes in engine speed also having an operative connection with said device for adjusting the rise across the supercharger in a manner such as to maintain the manifold pressure at the selected value irrespective of changes in engine speed.

6. In a power control system for an aircraft engine provided with a supercharger and an intake manifold, a device adjustable to regulate the rise across the supercharger, a power control member such as a pilot's quadrant, means operatively connecting said power control member to said device including a pressure responsive device and associated means adjustable by movement of said member to maintain a selected manifold pressure at varying altitudes, and an engine driven speed indicator also having an operative connection with said device and arranged to maintain the manifold pressure at the selected value irrespective of changes in engine speed.

7. In a power control system for an aircraft engine provided with a supercharger and a throttle controlled air intake conduit terminating in an intake manifold and a device adjustable to regulate the rise across the supercharger, in combination, a primary manifold pressure regulator including variable datum means operatively connected to the throttle for automatically positioning the latter to maintain a selected manifold pressure up to substantially wide open throttle, a supercharger speed control including means coordinated with said first named variable datum means and operatively connected to said device for adjusting the rise across the supercharger; a power control member such as a pilot's quadrant for adjusting said variable datum means to maintain a selected manifold pressure at varying altitudes, and means responsive to changes in engine speed arranged to adjust said device to maintain a selected manifold pressure at a given setting of said member irrespective of changes in engine speed.

8. In a power control system for an aircraft engine provided with a supercharger and a fluid coupling for transmitting an infinitely variable drive from the engine to the supercharger, a hydraulic valve for regulating the flow of hydraulic fluid to said coupling, a manifold pressure regulator operatively connected to said valve including variable datum means adjustable to preselect manifold pressure at a given altitude and engine speed, and means responsive to changes in engine speed operatively connected to said regulator and said valve and arranged in a manner such that variations in the drive transmitted to the supercharger through said fluid coupling resulting from changes in engine speed from a predetermined coordinated value are compensated for through automatic adjustment of said valve at a given setting of said variable datum means.

9. In a power control system for an aircraft engine provided with a supercharger and a fluid coupling for transmitting an infinitely variable drive from the engine to the supercharger, a hydraulic valve for regulating the flow of hydraulic fluid to the coupling, a manifold pressure regulator including an aneroid and associated variable datum means adjustable to preselect manifold pressure at a given altitude and engine speed, a power control member such as a pilot's quadrant connected to said valve through said variable datum means, and an engine driven device also operatively connected to said valve and said variable datum means and arranged to compensate for variations in the drive speed transmitted to the supercharger through said fluid coupling from a predetermined coordinated value.

10. The method of regulating the rise across a supercharger driven through variable transmission means including a fluid coupling having a rotatable driven element driven from a prime mover and a coacting driving element drivably connected to the supercharger, which consists in metering hydraulic fluid to the coupling at a rate proportional to the speed of the prime mover.

11. In a supercharging system for an aircraft engine wherein a supercharger is driven from the engine through variable transmission means including a fluid coupling, a valve for metering fluid to the coupling, means responsive to changes in engine speed operatively connected to said valve for positioning the latter as a function of engine speed, a device responsive to changes in air density also operatively connected to said valve, and power control means arranged to adjust said device and simultaneously modify the action of said engine speed responsive means.

12. In a supercharging system for an aircraft engine wherein a supercharger is driven from the engine through variable transmission means including a fluid coupling, a valve for metering fluid to the coupling, means responsive to changes in engine speed for positioning the valve as a function of engine speed, another valve for regulating the flow of fluid to said metering valve, and means for also positioning said flow regulating valve as a function of engine speed.

13. In a supercharging system for an aircraft engine wherein a supercharger is driven from the engine through variable transmission means including a fluid coupling having a driving element and a driven element between which the slip varies in relation to oil fill, a movable valve having one or more metering orifices for metering fluid to the coupling, engine driven means for positioning said valve as a function of engine speed, means for producing a metering differential across said orifice or orifices proportional to the square of engine speed to flow fluid to said coupling at a rate proportional to engine speed and whereby the speed of the supercharger will vary in proportion to engine speed and a metering valve position giving a certain percent slip at one engine speed will give the same percent slip at any engine speed, and means for subjecting said valve to fluid pressure to automatically accelerate its rate of movement when it is initially moved toward metering position including a port adapted to be opened when the valve has been moved to a predetermined position.

14. In a supercharging system for an aircraft engine having a supercharger provided with a low speed hydraulic coupling and a high or higher speed hydraulic coupling, a valve for metering hydraulic fluid to said couplings, said valve having a series of metering orifices or ports for each coupling, a valve member which when moved to a metering position in a direction to increase the drive on the supercharger first uncovers the metering orifices for the low speed coupling until minimum low coupling slip is attained and then uncovers the metering orifices for the high speed coupling, and means for automatically producing an accelerated or snap-action movement of said valve member when minimum low coupling slip is attained to a position where fluid is metered to the high speed coupling, causing the latter to quickly over-drive the low speed coupling.

15. In a hydraulic metering system for a fluid coupling, a metering valve comprising a casing, a valve assembly slidably mounted in said casing and including a supporting member and a valve member slidable on said supporting member, a stop defining the limit of sliding movement of the valve member, said supporting member and valve member having spaced portions which together with the casing define a pressure chamber, means for conducting fluid under pressure to said chamber including a valve port adapted to be opened when the supporting member has moved a predetermined distance in said casing, and means resiliently urging said valve member toward said stop.

16. In a hydraulic metering system for a fluid coupling, a metering valve comprising a casing provided with an inlet port for hydraulic fluid under pressure and one or more discharge metering ports, a valve assembly slidable in said casing and including a central plunger having stops at opposite ends thereof, an annularly stepped member slidable on said plunger within the limits of said stops, a spring normally urging said member in a direction tending to close the valve, a valve member slidable on said stepped member, another spring normally urging the valve member toward closed position, the steps of said annularly stepped member defining a stop limiting movement of the valve member toward closed position, said stepped member and plunger and said valve member and stepped member being provided with pressure chambers therebetween, means for conducting fluid under pressure to said chambers including spaced inlet ports adapted to be opened successively when the valve assembly has been initially moved toward metering position.

17. In a supercharging system for an engine wherein a supercharger is driven from the engine through variable transmission means including a fluid coupling, a valve having one or more metering orifices for metering fluid to the coupling, means for automatically positioning said valve in relation to engine speed, and means for maintaining a metering head or differential across said metering orifice or orifices proportional to the square of engine speed, thus establishing a metering rate to the coupling proportional to engine speed directly.

FRANK C. MOCK.
EDWIN G. KELLER.

REFERENCES CITED

The following references are of record in the file of this patent:

UNITED STATES PATENTS

| Number | Name | Date |
|---|---|---|
| 2,217,364 | Halford et al. | Oct. 8, 1940 |
| 2,290,884 | Kollmann | July 28, 1942 |
| 2,297,237 | Nallinger | Sept. 29, 1942 |
| 2,301,653 | Wells | Nov. 10, 1942 |
| 2,372,326 | Hewitt | Mar. 27, 1945 |
| 2,380,074 | Roche | July 10, 1945 |
| 2,400,307 | Hobbs et al. | May 14, 1946 |
| 2,429,423 | Mock | Oct. 21, 1947 |